US012756038B2

(12) United States Patent
Lee et al.

(10) Patent No.: US 12,756,038 B2
(45) Date of Patent: Oct. 6, 2026

(54) SECONDARY BATTERY AND BATTERY MODULE

(71) Applicant: SK On Co., Ltd., Seoul (KR)

(72) Inventors: Jong Hyeok Lee, Daejeon (KR); Yoon Ji Jo, Daejeon (KR); Chang Mook Hwang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 569 days.

(21) Appl. No.: 17/871,350

(22) Filed: Jul. 22, 2022

(65) Prior Publication Data

US 2023/0031170 A1 Feb. 2, 2023

(30) Foreign Application Priority Data

Jul. 30, 2021 (KR) ........................ 10-2021-0100718

(51) Int. Cl.
*H01M 50/105* (2021.01)
*H01M 10/615* (2014.01)
(Continued)

(52) U.S. Cl.
CPC ....... *H01M 50/105* (2021.01); *H01M 10/615* (2015.04); *H01M 10/6554* (2015.04);
(Continued)

(58) Field of Classification Search
CPC ............. H01M 50/264; H01M 50/133; H01M 50/559; H01M 50/15; H01M 50/548;
(Continued)

(56) References Cited

U.S. PATENT DOCUMENTS 10,312,488 B2 6/2019 Seo et al.
2015/0147633 A1* 5/2015 Ahn .................... H01M 50/548 429/176
(Continued)

FOREIGN PATENT DOCUMENTS

CN 210350041 U 4/2020
JP H10112296 A * 4/1998
(Continued)

OTHER PUBLICATIONS

Extended European Search Report for the European Patent Application No. 22187666.7 issued by the European Patent Office on Dec. 19, 2022.
(Continued)

*Primary Examiner* — Susan D Leong
*Assistant Examiner* — Timothy G Hemingway
(74) *Attorney, Agent, or Firm* — IP&T GROUP LLP

(57) ABSTRACT

Proposed is a secondary battery including an electrode assembly, an electrode assembly, a plate disposed on both sides of the electrode assembly, and a pouch film coupled to the plate and accommodating the electrode assembly. The secondary battery has a structure in which the pouch film seals the outer edges of the plate to accommodate the electrode assembly, so that no cup is formed in the process of forming of the pouch film. As a result, there is no limit to the increase in thickness of the electrode assembly, thereby increasing the energy density per volume of the battery.

17 Claims, 14 Drawing Sheets

(51) Int. Cl.

| | |
|---|---|
| ***H01M 10/6554*** | (2014.01) |
| ***H01M 10/6556*** | (2014.01) |
| ***H01M 50/124*** | (2021.01) |
| ***H01M 50/627*** | (2021.01) |

(52) U.S. Cl.
CPC ..... *H01M 10/6556* (2015.04); *H01M 50/124* (2021.01); *H01M 50/627* (2021.01)

(58) Field of Classification Search
CPC ............. H01M 50/103; H01M 50/105; H01M 50/147; H01M 50/148; H01M 50/211; H01M 50/209; H01M 50/102; H01M 10/6557; H01M 10/6552; H01M 10/647
See application file for complete search history.

(56) References Cited

U.S. PATENT DOCUMENTS

| | | | | |
|---|---|---|---|---|
| 2020/0076025 | A1 | 3/2020 | Jo et al. | |
| 2020/0373634 | A1 | 11/2020 | Choi | |
| 2021/0234223 | A1* | 7/2021 | Taniuchi | H01M 10/613 |
| 2022/0263167 | A1* | 8/2022 | Taniuchi | H01M 50/211 |

FOREIGN PATENT DOCUMENTS

| | | | | | |
|---|---|---|---|---|---|
| JP | 2003-007344 | A | | 1/2003 | |
| JP | 2006179442 | A | * | 7/2006 | |
| KR | 10-1094024 | B1 | | 12/2011 | |
| KR | 10-1496547 | B1 | | 2/2015 | |
| KR | 10-1623106 | B1 | | 5/2016 | |
| KR | 10-2017-0006046 | A | | 1/2017 | |
| KR | 10-2019-0064887 | A | | 6/2019 | |
| KR | 2019110349 | A | * | 9/2019 | H01M 10/0481 |
| KR | 10-2020-0012296 | A | | 2/2020 | |
| KR | 10-2020-0095536 | A | | 8/2020 | |
| KR | 10-2197407 | B1 | | 12/2020 | |
| WO | 2019/110317 | A1 | | 6/2019 | |
| WO | WO-2020016937 | A1 | * | 1/2020 | H01M 10/625 |

OTHER PUBLICATIONS

Action for Korean Patent Application No. 10-2021-0100718 issued by the Korean Patent Office on Jul. 29, 2025.
Notice of Allowance for Korean Patent Application No. 10-2021-0100718 issued by the Korean Patent Office on Jun. 24, 2026.

* cited by examiner

SECONDARY BATTERY AND BATTERY MODULE

CROSS REFERENCE TO RELATED APPLICATION

The present application claims priority to Korean Patent Application No. 10-2021-0100718, filed Jul. 30, 2021, the entire contents of which is incorporated herein for all purposes by this reference.

BACKGROUND OF THE INVENTION

Field of the Invention

The present disclosure relates to a secondary battery and a battery module.

Description of the Related Art

With the increasing demand for portable electronic devices, electric vehicles, etc. using batteries, various types of secondary batteries are being developed. Depending on the type of a casing for accommodating an electrode assembly including a positive electrode, a separator, and a negative electrode, a secondary battery may be classified as a pouch-shaped battery, a prismatic battery, or a cylindrical battery. A pouch-shaped secondary battery is manufactured by enclosing an electrode assembly a pouch film made of an aluminum sheet and a synthetic resin and sealing the outer edges of the pouch film through thermal fusion or the like. In the pouch film, a cup-shaped space for accommodating the electrode assembly is formed through a forming process. In the forming process, the cup-shaped space is formed by pressing the pouch film using a mold. The apexes of the cup-shaped space may become thinner or cracked as the pouch film is stretched. Because the shape of the cup formed through the forming process is limited by factors such as elongation of the pouch film, there is a limit to the volume of the battery assembly that can be accommodated in a single pouch-shaped secondary battery. In addition, because opposed sealing ends of the pouch film protrude outside the pouch-shaped secondary battery, the space utilization may be limited, the energy density per volume of space may be degraded, and the thermal conductivity may be degraded.

The foregoing is intended merely to aid in the understanding of the background of the present disclosure, and is not intended to mean that the present disclosure falls within the purview of the related art that is already known to those skilled in the art.

Documents of Related Art (Patent document 1) Korean Patent No. 10-1623106 B1

SUMMARY OF THE INVENTION

An objective of the present disclosure is to provide a secondary battery having a structure in which a plate is disposed on both sides of an electrode assembly and a pouch film seals the outer edges of the plate to accommodate the electrode assembly, and to provide a battery module.

In order to achieve the above objective, according to one aspect of the present disclosure, there is provided a secondary battery including: an electrode assembly; a plate disposed on both sides of the electrode assembly; and a pouch film coupled to the plate and accommodating the electrode assembly.

Furthermore, the plate may include an inclined portion on a side where an electrode tab of the electrode assembly is disposed.

Furthermore, the plate may include rounded corners.

Furthermore, the inclined portion may be formed such the plate protrudes at a center portion thereof toward the electrode tab of the electrode assembly and has down-slope surfaces at both sides of the center portion of the plate or such that the plate protrudes at one side thereof toward the electrode tab of the electrode assembly and has a down-slope surface.

Furthermore, the plate is made of a material including any one of metal, alloy, polymer, synthetic resin, and ceramic.

Furthermore, the plate may be made of metal, and may include a coaling layer made of the same material as an inner coating of the pouch film, the coating layer being formed on a surface thereof in contact with the pouch film.

Furthermore, the plate may include an electrolyte injection hole through which an electrolyte is injected into the secondary battery.

Furthermore, the plate may include a gas outlet through which gas is discharged to outside of the secondary battery.

Furthermore, the plate may include a flow channel through which a cooling fluid or a heating fluid flows.

Furthermore, the plate may include a protrusion on a surface thereof opposite to a surface thereof facing the electrode assembly.

According to another aspect of the present disclosure, there is provided a battery module including a plurality of secondary batteries stacked in a direction, a secondary battery including an electrode assembly, a plate disposed on both sides of the electrode assembly, and a pouch film coupled to the plate and accommodating the electrode assembly. The secondary battery may be configured such that the plate is disposed on the electrode assembly in a first direction, and an electrode tabs of the electrode assembly is disposed in a second direction orthogonal to the first direction.

Furthermore, the plate may include a first hole extending therethrough in a direction, and the pouch film may include a second hole formed at a position corresponding to the first hole.

Furthermore, the battery module may further comprise a rod penetrating through the first hole and second hole and fixing the plurality of secondary batteries.

Furthermore, the rod may include a flow channel through which a cooling fluid flows.

Furthermore, the battery module may further include a heat sink disposed in contact with the plates.

The above and other objectives, features, and advantages of the present disclosure will be more clearly understood from the following detailed description when taken in conjunction with the accompanying drawings.

All terms or words used in the specification and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to the embodiment of the present disclosure, no apexes are formed in the process of forming of the pouch film. This minimizes a stress generated on a stretched portion of the pouch film, and improves the safety of the battery.

In addition, according to the embodiment of the present disclosure, no cup is formed in the process of forming of the pouch film, so that there is no limit to the increase in thickness of the electrode assembly, thereby increasing the energy density per volume of the battery.

In addition, according to the embodiment of the present disclosure, the plates can be used to perform a cooling or heating process.

In addition, according to the embodiment of the present disclosure, most of existing processes for the manufacture of pouch-type secondary battery can be used, so that the cost required for the improvement of process facilities is low.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
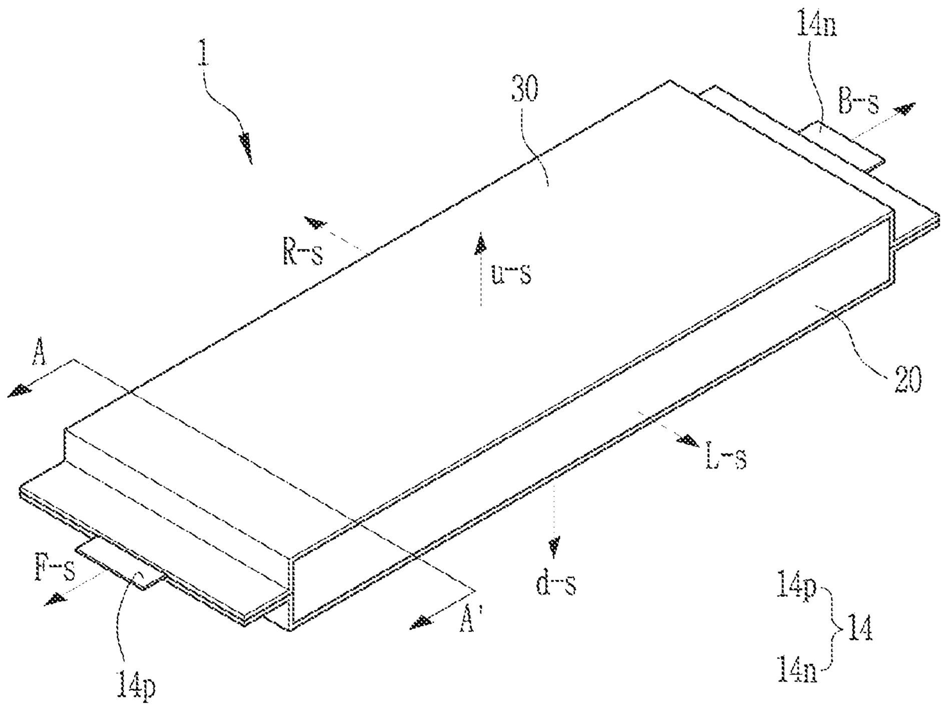
FIG. 1 is a perspective view illustrating a secondary battery according to an embodiment of the present disclosure in which electrode tabs are disposed on both sides thereof.

The above and other objectives, features, and other advantages of the present disclosure will be more clearly understood from the following detailed description and preferable embodiments when taken in conjunction with the accompanying drawings. As for reference numerals associated with parts in the drawings, the same reference numerals will refer to the same or like parts throughout the drawings. It will be understood that, although the terms "first surface", "second surface", "first", "second", etc. may be used only to distinguish one element from another element, these elements should not, be limited by these terms. In the following description, details of well-known features and techniques may be omitted to avoid unnecessarily obscuring the present disclosure.

Hereinbelow, exemplary embodiments of the present disclosure will be described in detail with reference to the accompanying drawings.

Figure 2:
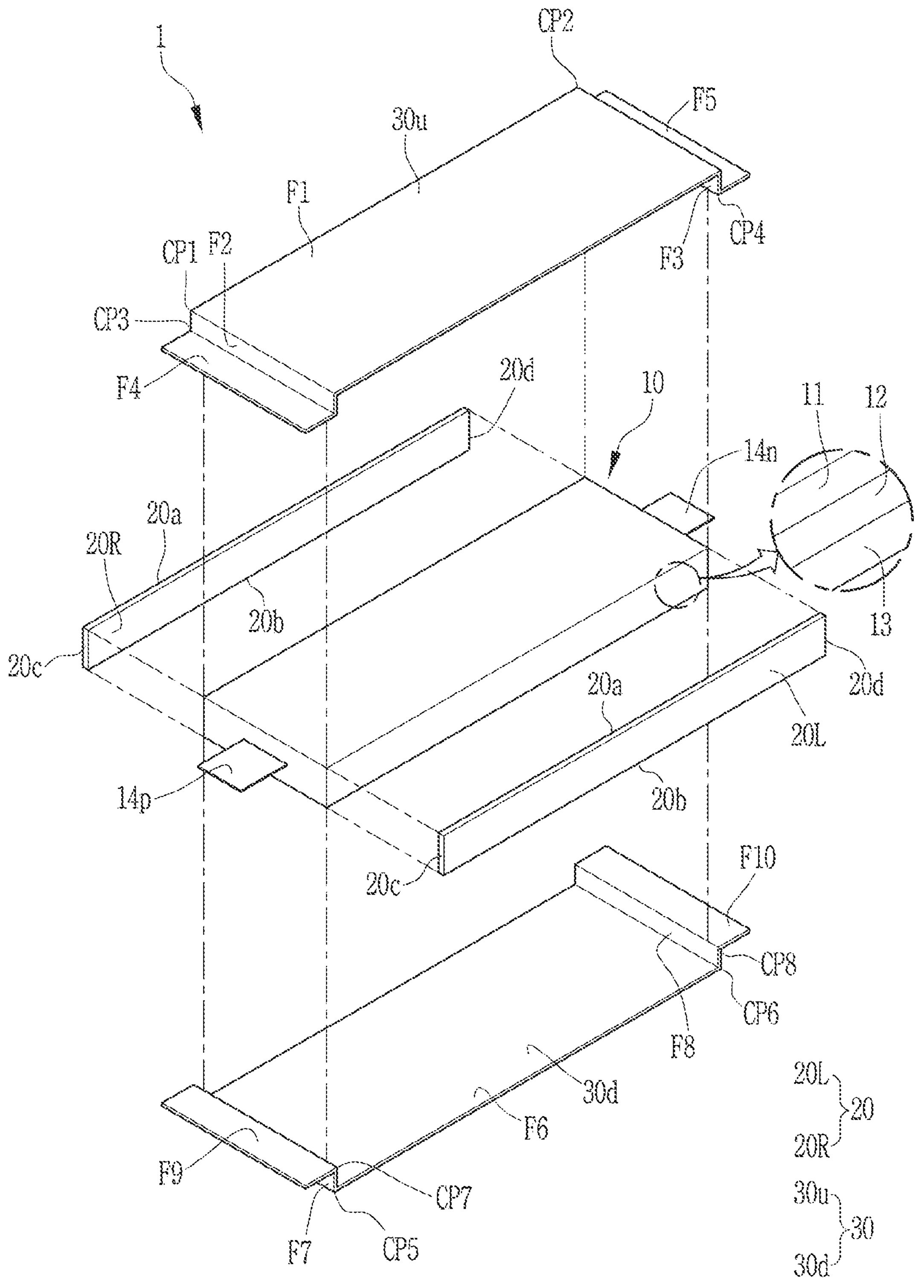
FIG. 2 is an exploded perspective view illustrating the secondary battery according to the embodiment of the present disclosure in which the electrode tabs are disposed on both sides thereof.
Figure 3:
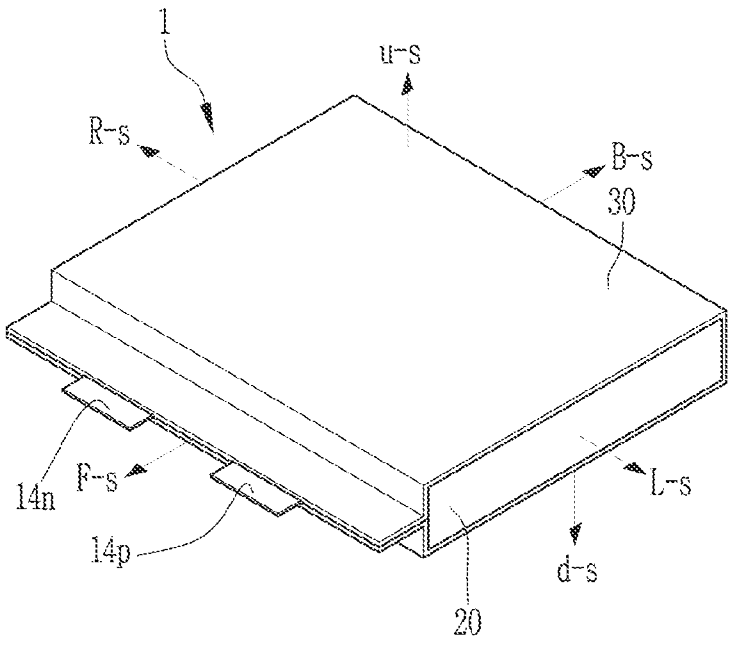
FIG. 3 is a perspective view illustrating a secondary battery according to an embodiment of the present disclosure in which electrode tabs are disposed on one side thereof.
Figure 4:
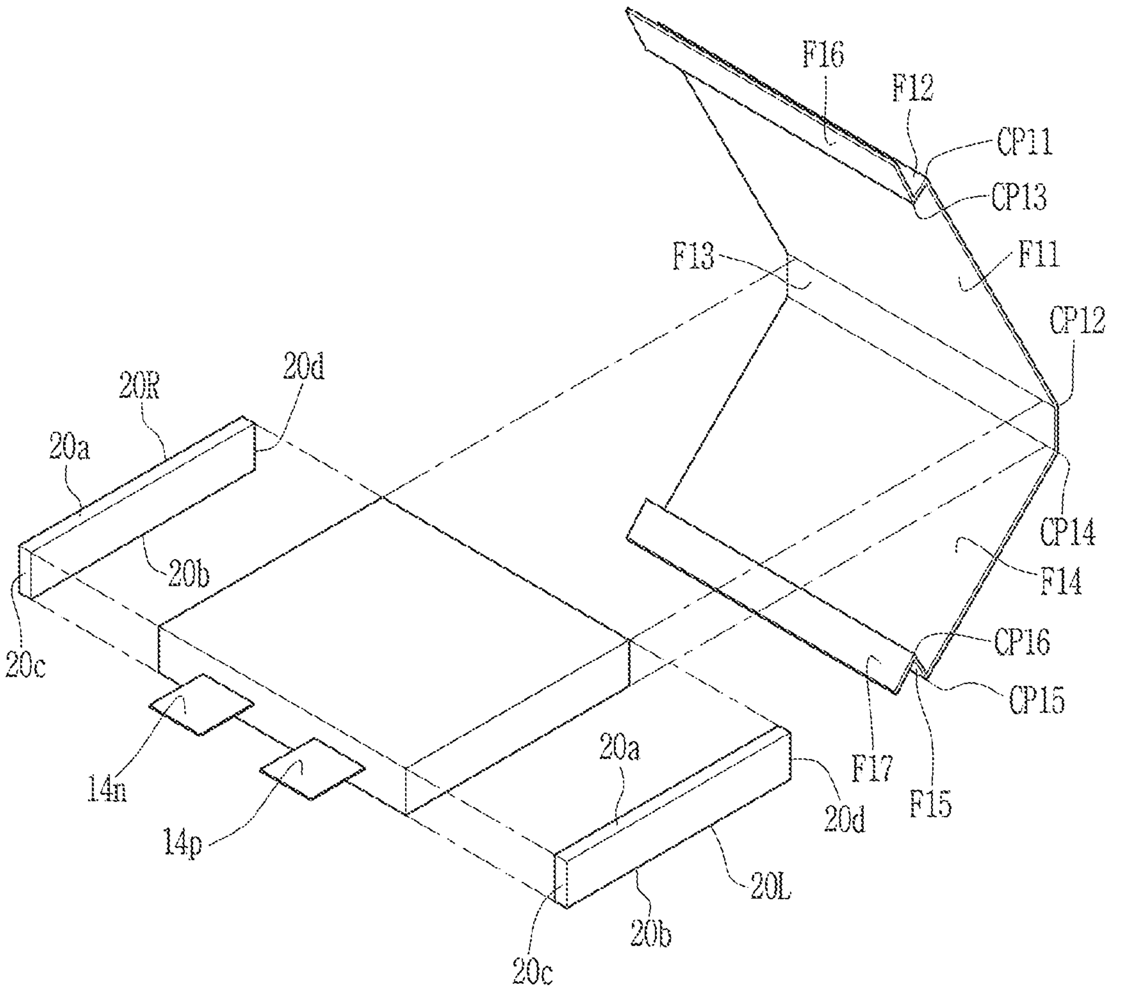
FIG. 4 is an exploded perspective view illustrating the secondary battery according to the embodiment of the present disclosure in which the electrode tabs are disposed on one side thereof.

FIG. 1 is a perspective view illustrating a secondary battery 1 according to an embodiment of the present disclosure in Which electrode tabs 14 are disposed on both sides thereof. FIG. 2 is an exploded perspective view illustrating the secondary battery 1 according to the embodiment of the present disclosure in which the electrode tabs 14 are disposed on both sides thereof. FIG. 3 is a perspective view illustrating a secondary battery 1 according to an embodiment of the present disclosure in which electrode tabs 14 are disposed on a one side thereof. FIG. 4 is an exploded perspective view illustrating the secondary battery 1 according to the embodiment of the present disclosure in which the electrode tabs 14 are disposed on one side thereof.

As illustrated in FIGS. 1, 2, 3 and 4, the secondary battery 1 according to the embodiment of the present disclosure may include an electrode assembly 10 and a plate 20 disposed on both sides of the electrode assembly 10, and a pouch film 30 coupled to the plate 20 and accommodating the electrode assembly 10.

The electrode assembly 10 includes a negative electrode 13, a separator 12, a positive is electrode 11, and the electrode tabs 14. The electrode tabs 14 include a negative electrode tab 14*n* and a positive electrode tab 14*p*. The electrode assembly 10 may be formed by repeatedly stacking a plurality of negative electrodes 13, separators 12, and positive electrodes 11. The electrode assembly 10 may be formed by stacking or winding.

The positive electrode 11 may include a positive electrode active material such as lithium iron phosphate (LFP), nickel cobalt aluminum (NCA), nickel cobalt manganese (NCM), lithium cobalt oxide (LCO), lithium manganese oxide (LMO), etc. Alternatively, any positive electrodes to be developed in the future may be used as the positive electrode 11. The negative electrode 13 may include a negative electrode active material such as graphite, metal oxide, silicon oxide, carbon, carbon nanotubes (CNTs), etc. Alternatively, any negative electrodes to be developed in the future may be used as the negative electrode 13. The separator 12 may include a polyolefin-based material such as PE (polyethylene) or PP (polypropylene), etc. Alternatively, any separators of new materials and structures to be developed in the future may be used as the separator 12.

The electrode tabs 14 include the positive electrode tab 14*p* and the negative electrode tab 14*n*. As illustrated in FIGS. 1 and 2, the positive electrode tab 14*p* may be disposed on one side of the secondary battery 1, and the negative electrode tab 14*n* may be disposed on the opposite side of the secondary battery 1. Alternatively, as illustrated in FIGS. 3 and 4, the positive electrode tab 14*p* and the negative electrode tab 14*n* may be disposed together at one side of the secondary battery 1. The secondary battery 1 according to the embodiment of the present disclosure may be applied to a structure in which the electrode tabs 14 are all disposed on one side thereof, and a structure in which the positive electrode tab 14*p* and the negative electrode tab 14*n* are disposed separately at both sides thereof. In this specification, both sides mean opposite sides, i.e., one side and the opposite side.

The plates 20 have a substantially planar plate shape. The length and height of the plates 20 may be determined to correspond to those of the electrode assembly 10. The thickness of the plates 20 may be determined to be a thickness sufficient to be coupled to the pouch film 30. The plates 20 may include a first plate 20L and a second plate 20R.

When a stacking direction of electrode assemblies 10 is defined as a vertical direction, the sides where the electrode assemblies 10 are disposed are defined as an upper side u-s and a lower side d-s, and the sides where the positive electrode tab 14*p* and the negative electrode tab 14*n* are disposed are defined as a front side F-s and a back side B-s. In this case, the first plate 20L and the second plate 20R may be disposed on a left side L-s and a right side R-s of the electrode assembly 10, respectively. The upper side u-s, lower side d-s, front side F-s, back side B-s, left side L-s, and right side R-s are defined with respect to the secondary battery 1.

The plates 20 may be respectively disposed on both sides of the electrode assembly 10 where the electrode tabs 14 are not disposed. In both the structure in which the negative electrode tab 14*n* and the positive electrode tab 14*p* are respectively disposed on the front side F-s and the back side B-s and the structure in which the negative electrode tab 14*n* and the positive electrode tab 14*p* are disposed on one side (for example, the front side F-s, the plates 20 may be respectively disposed on the left and right sides L-s and R-s perpendicular to the stacking direction of the electrode assemblies 10 and perpendicular to the direction in which the electrode tabs 14 are disposed. That is, the first plate 201, may be disposed on the left side of the electrode assembly 10, and the second plate 20R may be disposed on the right side of the electrode assembly 10.

As illustrated in FIGS. 1 and 2, the pouch film 30 may include a first pouch film 30*u* covering the upper side u-s of the electrode assembly 10, and a second pouch film 30*d* covering the lower side d-s of the electrode assembly 10. When the positive electrode tab 14*p* and the negative to electrode tab 14*n* are disposed on the front and back sides F-s and B-s, respectively, two pouch films 30 may be provided.

The first pouch film 30*u* and the second pouch film 30*d* may be subjected to forming to cover the electrode assembly 10 and the pair of plates 20 disposed on both sides (for example, left and right sides Ls and Rs) of the electrode assembly 10. The forming process may be performed to is form the first pouch film 30*u* and the second pouch film 30*d* into shapes corresponding to the shape of the plates 20 and the arrangement and shape of the electrode tabs 14.

As illustrated in FIGS. 1 and 2, when the plates 20 have a rectangular shape and the electrode tabs 14 are disposed at the centers of front and back surfaces of the electrode assembly 10, the first pouch film 30*u* may include a first film portion F1 corresponding to upper surfaces 20*a* of the plates 20, a second film portion F2 corresponding to portions of front surfaces 20*c* of the plates 20 and connected to a front side F-s of the first film portion F1, a third film portion F3 corresponding to portions of back surfaces 20*d* of the plates 20 and connected to a back side B-s of the first film portion F1, a fourth film portion F4 connected to a front side F-s of the second film portion F2, and a fifth film portion F5 connected to a back side B-s of the third film portion F3. To this end, forming may be performed to form a first curved point CP1 between the first film portion F1 and the second film portion F2, a second curved point CP2 between the first film portion F1 and the third film portion F3, a third curved point CP3 between the third film portion F3 and the fourth film portion F4, and a fourth curved point CP4 between the third film portion F3 and the fifth film portion F5.

The second pouch film 30*d* may have a structure corresponding to the first pouch film 30*u* and may include a sixth film portion F6 corresponding to lower surfaces 20*b* of the plates 20, a seventh film portion F7 corresponding to portions of front surfaces 20*c* of the plates 20 and connected to a front side F-s of the sixth film portion F6, an eighth film portion F8 corresponding to portions of back surfaces 20*d* of the plates 20 and connected to a back side B-s of the sixth film portion F6, a ninth film portion F9 connected to a front side F-s of the seventh film portion F7, and a tenth film portion F10 connected to a back side B-s of the eighth film portion F8. To this end, forming may be performed to form a first curved point CP5 between the sixth film portion F6 and the seventh film portion F7, a sixth curved point CP6 between the sixth film portion F6 and the eighth tilt portion F8, a seventh curved point CP7 between the seventh film portion F7 and the ninth film portion F9, and an eighth curved point CP8 between the eighth film portion F8 and the tenth film portion F10.

As illustrated in FIGS. 3 and 4, when the positive electrode tab 14*p* and the negative electrode tab 14*n* are disposed on one side of the electrode assembly 10, a single pouch film 30 may be provided.

The single pouch film 30 may be subjected to forming to cover the electrode assembly 10 and the pair of plates 20 disposed on both sides (for example, left and right sides Ls and Rs) of the electrode assembly 10. The single pouch film 30 may be subjected to forming to surround the upper, lower, front, and back surfaces 20*a*, 20*b*, 20*c*, and 20*d* of the pair of plates 20. The forming process may be performed to form the pouch film 30 into a shape corresponding to the shape of the plates 20 and the arrangement and shape of the electrode tabs 14.

As illustrated in FIGS. 3 and 4, when the plates 20 have a rectangular shape and the electrode tabs 14 are disposed at the center of a front surface of the electrode assembly 10, the pouch film 30 may include an eleventh film portion F11 corresponding to upper surfaces 20*a* of the plates 20, a twelfth film portion F12 corresponding to portions of front surfaces 20*c* of the plates 20 and connected to a front side F-s of the eleventh film portion F11, a thirteenth film portion F13 corresponding to back surfaces 20*d* of the plates 20 and connected to a back side B-s of the eleventh film portion F11, a fourteenth film portion F14 corresponding to lower surfaces 20*b* of the plates 20 and connected to a back side B-s of the thirteenth film portion F13, a fifteenth film portion F15 corresponding to portions of the front surfaces 20*c* of the plates 20 and connected to a back side B-s of the fourteenth film portion F14, a sixteenth film portion F16 connected to a front side F-s of the twelfth film portion F12, and a seventeenth film portion F17 connected to a back side B-s of the fifteenth film portion F15. Tb this end, forming may be performed to form an eleventh curved point CP11 between the eleventh film portion F11 and the twelfth film portion F12, a twelfth curved point CP12 between the eleventh film portion F11 and the thirteenth film portion F3, a thirteenth curved point CP13 between the twelfth film portion F12 and the sixteenth film portion F16, a fourteenth curved point CP14 between the thirteenth film portion F13 and the fourteenth film portion F14, a fifteenth cursed point CP15 between the fourteenth film portion F14 and the fifteenth film portion F15, and a sixteenth curved point CP16 between the fifteenth film portion F15 and the seventeenth film portion F17.

The secondary battery 1 illustrated in FIGS. 1 and 2 and the secondary battery 1 illustrated in FIGS. 3 and 4 commonly have a structure in which during forming of the pouch film 30, an apex where three sides of the pouch film 30 meet is not formed, but only a corner where two sides of the pouch film 30 meet is formed.

Conventionally, in the case of forming a cup for accommodating the electrode assembly 10 by forming of the pouch film 30, more force may be concentrated on an apex of the cup where three sides of the pouch film 30 meet and the ductility limit of the pouch film 30 may be reached, so that there is a possibility that the pouch film 30 may be cracked. In addition, when the depth of the cup formed in the pouch film 30 increases, the number of apexes of the cup increases thereby increasing the possibility of cracks. This thus limits the height of the electrode assembly 10 accommodated in the cup.

However, in the embodiment of the present disclosure, a corner (that is, a curved point) where two sides of the pouch film 30 meet is formed during forming. That is, an apex where three sides of the pouch film 30 meet is not formed during forming. Therefore, according to the embodiment of the present disclosure, the ductility limit of the pouch film 30 is not reached during forming and thus the pouch film 30 is not cracked.

In addition, in the embodiment of the present disclosure, even when the height of the electrode assembly 10 is high, the electrode assembly 10 may be accommodated by using the plates 20 and the pouch films 30. For example, the plate 20 may be provided to have a height corresponding to that of the electrode assembly 10, then the pouch films 30 may be subjected to forming so that curved points thereof are located at positions corresponding to the height of the plates 20, and finally the plates 20 and the pouch films 30 may be coupled to accommodate the high electrode assembly 10 therein.

Figure 5:
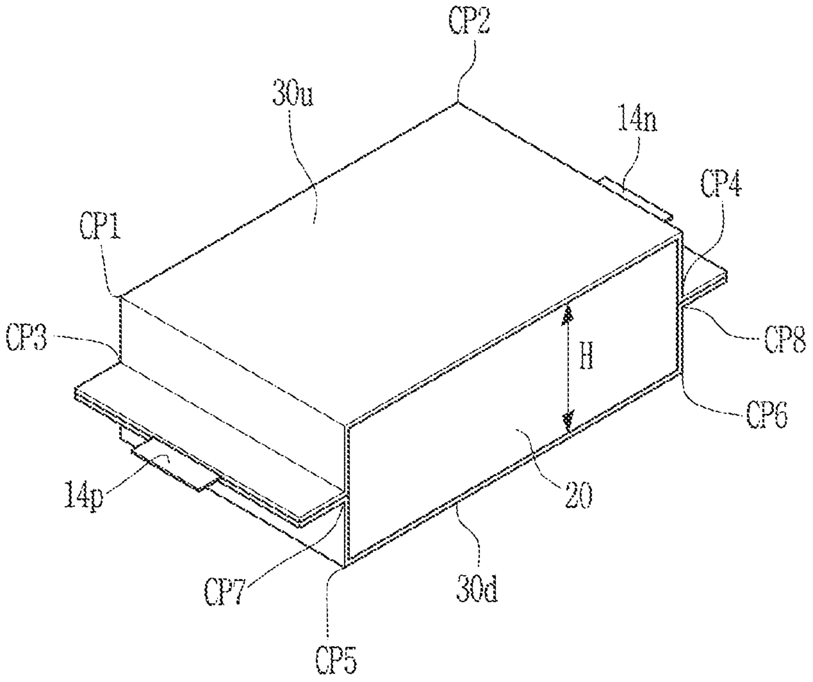
FIG. 5 is a perspective view illustrating a high-capacity secondary battery according to an embodiment of the present disclosure.

FIG. 5 is a perspective view illustrating a high-capacity secondary battery 1 according to an embodiment of the present disclosure.

As shown in FIG. 5, in the secondary battery 1 according to the embodiment of the present disclosure may accommodate an a high electrode assembly 10 formed by stacking a large number of negative electrodes 13, separators 12, and positive electrodes 11. Compared to the secondary battery 1 according to the embodiment of the present disclosure illustrated in FIGS. 1 and 2, the height H of a pair of plates 20 of the secondary battery 1 illustrated in FIG. 5 is higher, the distance between a first curved point CP1 and a third curved point CP3 and the distance between a second curved point CP2 and a fourth curved point CP4 of a first pouch film 30*u* are longer, and the distance between a fifth curved point CP5 and a seventh curved point CP7 and the distance between a sixth curved point CP6 and an eighth curved point CP8 of a second pouch film 30*d* are longer. As illustrated in FIG. 5, even when the height of the plates 20 is increased and the positions of the curved points of the pouch films 30 are changed, more stress is not concentrated on the curved points of the pouch films 30 during forming, so that cracks do not occur. The reason the stress is not concentrated on the curved points is that the pouch films 30 of the same lengths are not stretched during forming, but only the longer one of the pouch films 30 is used and formed so that the positions at which the pouch film 30 is curved are changed. Therefore, the secondary battery 1 may be manufactured to have a height corresponding, to that of the electrode assembly 10. That is, according to the embodiment of the present disclosure, there is no limit to the height of the electrode assembly 10 accommodated in the plates 20 and the pouch films 30. This may be equally applied to the secondary battery 1 in which the electrode tabs 14 are disposed only at one side thereof as illustrated in FIGS. 3 and 4. For example, the plates 20 may be provided to have a height corresponding to that of the electrode assembly 10, then the longer one of the pouch films 30 may be subjected to forming, its and finally the plates 20 and the pouch films 30 may be coupled to accommodate the electrode assembly 10 therein.

As described above, according to the embodiment of the present disclosure, since there is no limit to the size of the electrode assembly 10 accommodated in the secondary battery 1, the secondary battery 1 may be manufactured in a large size. Compared to using a plurality of small-sized secondary battery, using the large-sized secondary battery 1 according to the embodiment of the present disclosure ensures higher power density per volume.

Conventionally, a secondary battery has a structure in which terrace portions (not illustrated) formed as a resulting of sealing a pouch film protrude toward front, back, left, and right sides F-s, B-s, L-s, and R-s of the secondary battery. The protruding terrace portions cause space inefficiency when forming a battery module, and hinder heat transfer, resulting in inefficiency in cooling or heating the secondary battery.

However, in the case of the secondary battery 1 according to the embodiment of the present disclosure, terrace portions formed as a result of sealing the pouch films 30 exist only at the front and back sides F-s and B-s or one side (for example, the front side F-s) of the secondary battery 1 where the electrode tabs 14 are disposed. The plates 20 are disposed on the left and right sides L-s and R-s of the secondary battery 1, and portions of the secondary battery 1 where the plates 20 and the pouch films 30 are sealed do not protrude. This thus improves space efficiency when the secondary battery 1 is packaged to form a battery module 100.

Conventionally, because the secondary battery has a structure that surrounds an electrode assembly using only a pouch film, the height of the secondary battery is not fixed. In addition, when gas or the like is generated during the use of the secondary battery, the pouch expands and deforms the shape of the secondary battery.

However, in the case of the secondary battery 1 according to the embodiment of the present disclosure, the plates 20 disposed on both sides thereof firmly maintain the shape thereof, so that the secondary battery 1 may be manufactured to have a uniform height. This thus facilitates handling of the secondary battery 1 in the process of forming the battery module 100. In addition, even when gas or the like is generated during the use of the secondary battery 1, the amount of shape deformation thereof due to expansion is small because the plates 20 fix the pouch films 30 in place.

Figure 6:
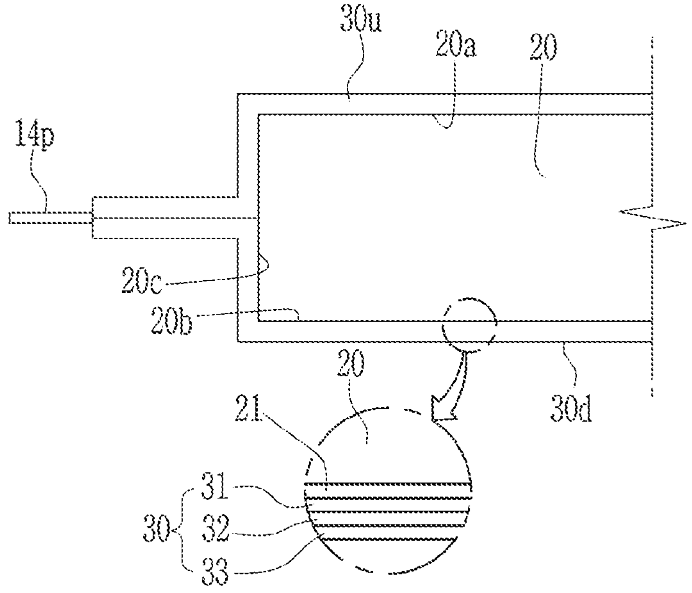
FIG. 6 is a side view illustrating where the electrode tabs are disposed as viewed from a left side or right side of the secondary battery according to the embodiment of the present disclosure.
Figure 7:
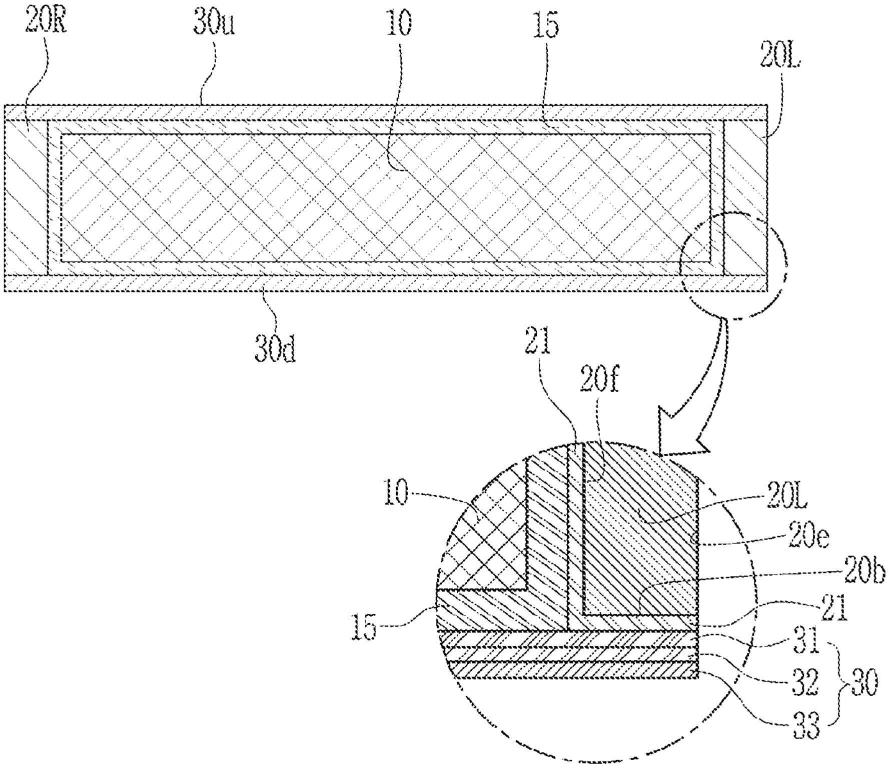
FIG. 7 is a sectional view taken along line A-A' of FIG. 1.

FIG. 6 is a side view illustrating where the electrode tabs 14 are disposed as viewed from the left side L-s or right side R-s of the secondary battery 1 according to the embodiment of the present disclosure. The secondary battery 1 illustrated in each of FIGS. 1 and 3 may be as illustrated in FIG. 6 when viewed from the left side L-s or the right side R-s thereof. FIG. 7 is a sectional view taken along line A-A' of FIG. 1.

The plate 20 may be formed such that an angle between an upper surface 20*a* and a front surface 20*c* thereof is a right angle (90 degree angle).

The plate 20 may be made of a material including any one of metal, alloy, polymer, synthetic resin, and ceramic. Each of the pouch films 30 may include an inner coating 31, a metal sheet 32, and an outer coating 33. The pouch films 30 may be coupled to the plates 20 in directions in which the respective inner coatings 31 come into contact with the plates 20.

A coating layer 21 may be formed on a surface of the plate 20 being in contact with the pouch films 30. Specifically, the coating layer 21 may be formed on each of the upper surface 20*a*, a lower surface 20*b*, the front surface 20*c*, and a back surface 20*d* of the plate 20. The coating layer 21 formed on the lower surface 20*b* of the plate 20 is illustrated in an enlarged view of FIG. 6. As that illustrated in the enlarged view of FIG. 6, the coating layers 21 may be also formed on the upper to surface 20*a*, the front surface 20*c*, and the back surface 20*d* of the plate 20. The coating layers 21 may be made of the same material as the inner coating 31 of the pouch film 30. The coating layers 21 formed on the plate 20 serves to allow the plate 20 to be coupled to the pouch film 30. When the plate 20 and the pouch film 30 are coupled to each other through thermal fusion, the coating layers 21 of the plate 20 and the inner coating 31 of the pouch film 30 may be coupled to each other.

The plate 20 may be made of a material having electrical conductivity. For example, the plate 20 may be made of metal. The plate 20 made of metal facilitates more rapid transfer of heat from the secondary battery 1 to outside, thereby facilitating cooling of the secondary battery 1, and facilitates more rapid transfer of heat from outside to the secondary battery 1, thereby facilitating heating of the secondary battery 1. However, when the plate 20 made of metal come into contact with the electrode assembly 10, there is a possibility of damage to the electrode assembly 10. Therefore, the coaling layer 21 may be further formed on a surface 20*f* of each of a first plate 20L and a second plate 20R, the surfaces 20*f* facing each other (that is, the surfaces facing the electrode assembly 10). The coating layers 21 formed on the surfaces 20*f* of the plates 20 facing the electrode assembly 10 may be made of an electrically insulating material (for example, the same material as the inner coating 31 of the pouch film 30). The coating layers 21 formed on the surfaces 20*f* of the plates 20 facing the electrode assembly 10 may prevent contact between the plates 20 and an electrolyte 15.

The width of the plates 20 may be determined to be a width sufficient to be coupled the pouch films 30 to be able to have sufficient sealing performance. The width of the plates 20 may be determined in consideration of sealing process conditions, the specifications of the pouch films 30, the thickness of the coating layers 21, and the like.

Figure 8:
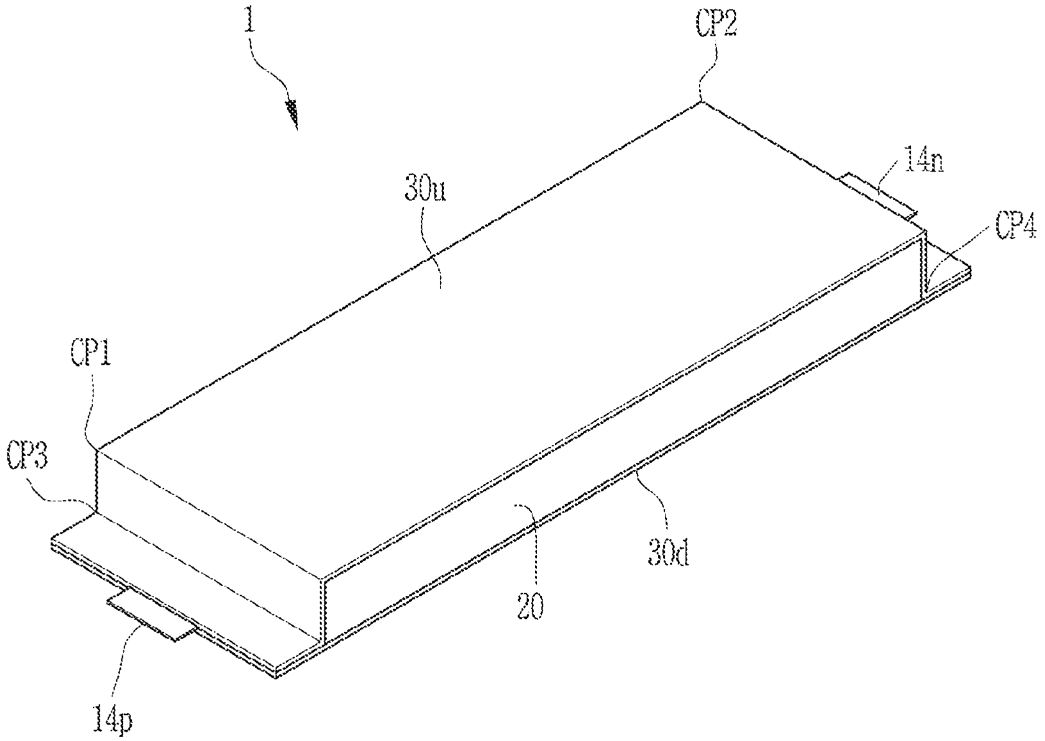
FIG. 8 is a perspective view illustrating a secondary battery according to an embodiment of the present disclosure in which only one pouch film is subjected to forming.

FIG. 8 is a perspective view illustrating a secondary battery 1 according to an embodiment of the present disclosure in which only one pouch film 30 is subjected to forming.

A pair of plates 20 may have a quadrangular shape the same as in FIGS. 1 and 2. Electrode tabs 14 may be disposed parallel to an upper or lower surface of the secondary battery 1. In FIG. 8, the electrode tabs 14 are disposed parallel to the lower surface of the secondary battery 1. A first pouch film 30*u* may be subjected forming to have curved points, and a second pouch film 30*d* may not be subjected to forming. Since only one of the first pouch film 30*u* and the second pouch film 30*d* is subjected to forming, the forming process may be simplified.

Figure 9:
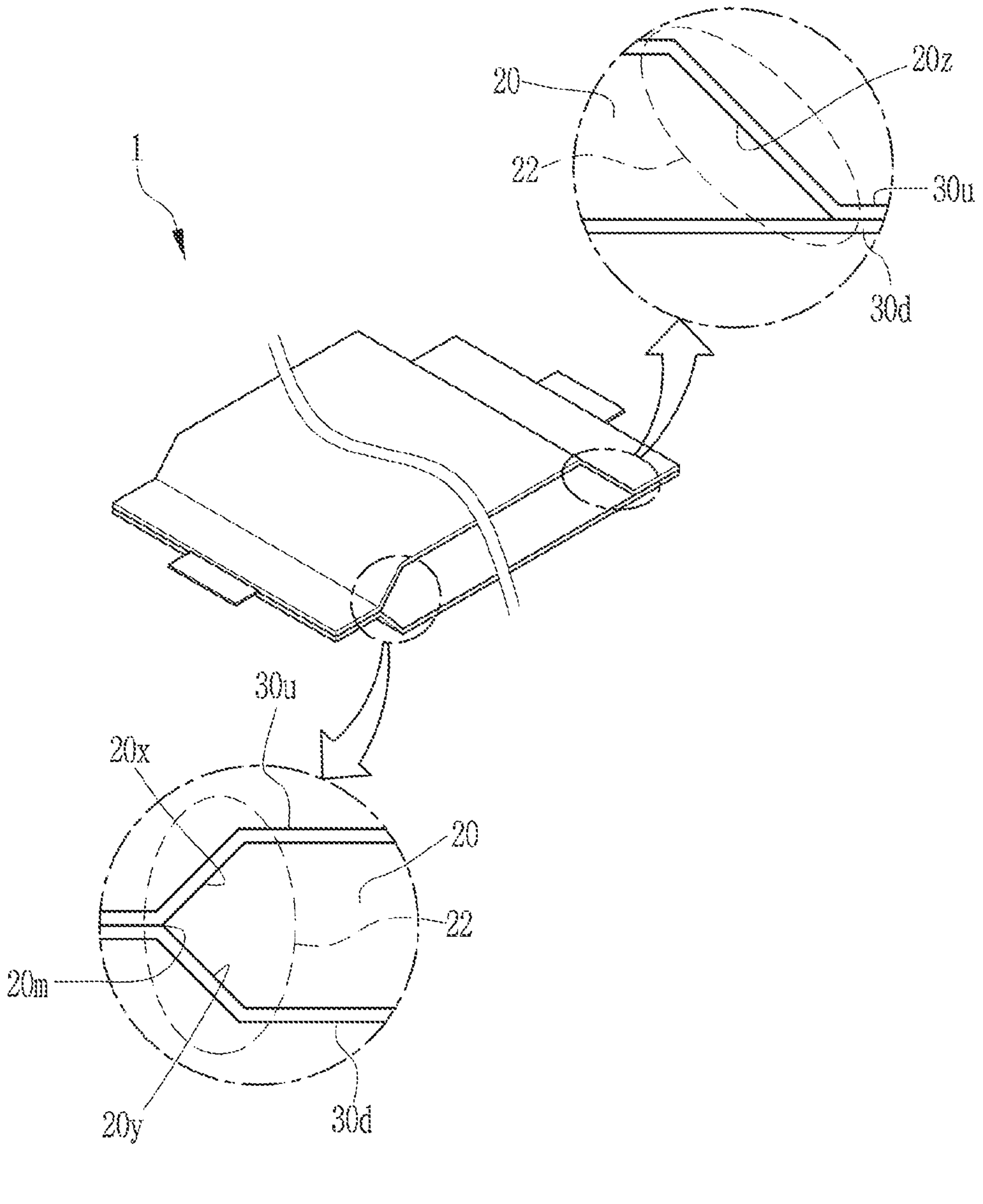
FIG. 9 is a view illustrating a secondary battery according to an embodiment of the present disclosure in which each plate has an inclined portion.

FIG. 9 is a view illustrating a secondary battery 1 according to an embodiment of the present disclosure in which each plate 20 has an inclined portion 22. FIG. 9 illustrates two types of inclined portions 22 together in one drawing.

As illustrated in FIGS. 1 to 8, the plates 20 may have a quadrangular shape in which an angle between each of the upper, lower, front, and back surfaces 20*a*, 20*b*, 20*c*, and 20*d* thereof is a right angle. In the case of the quadrangular plates 20, the coupling force between the plates 20 and the pouch films 30 may be weak at the corners of the plates 20, and there is a possibility that the pouch films 30 may be damaged by the corners of the plates 20. As illustrated in FIG. 9, a plate 20 may include the inclined portion 22 on a side where an electrode tab 14 of an electrode assembly 10 is disposed. Specifically, the inclined portion 22 may be formed on a front side F-s or a back side B-s where the electrode tab 14 is disposed. As illustrated in a lower enlarged view of FIG. 9, the inclined portion 22 may be formed such that the plate 20 protrudes at a center portion thereof toward the electrode tab 14 of the electrode assembly 10 and has down-slope surfaces at both sides of the center portion. Alternatively, as illustrated in an upper enlarged view of FIG. 9, the inclined portion 22 rimy be formed such that the plate 20 protrudes at one side thereof toward the electrode tab 14 of the electrode assembly 10 and has a down-slop surface.

The structure in which the inclined portion 22 is formed such that the plate 20 protrudes at the center portion 20*m* thereof and has the down-slope surfaces at both sides of the center portion 20*m* may be applied to the structure in which the electrode tabs 14 are disposed centrally as illustrated in FIGS. 1 to 4. The structure in which the inclined portion 22 is formed such that the plate 20 protrudes at the one side thereof and has the down-slope surface 20*z* may be applied to the structure in which the electrode tabs 14 are disposed on the upper side u-s or the lower side d-s as illustrated in FIG. 8.

The inclined portion 22 ensures that when thermal fusion is performed to couple the plate 20 and a pouch film 30, the pouch film 30 and the down-slope surface 20*x*, 20*y*, or 20*z* of the inclined is portion 22 are more firmly coupled to each other. Therefore, the plate 20 and the pouch film 30 may be more strongly coupled to each other.

Figure 10:
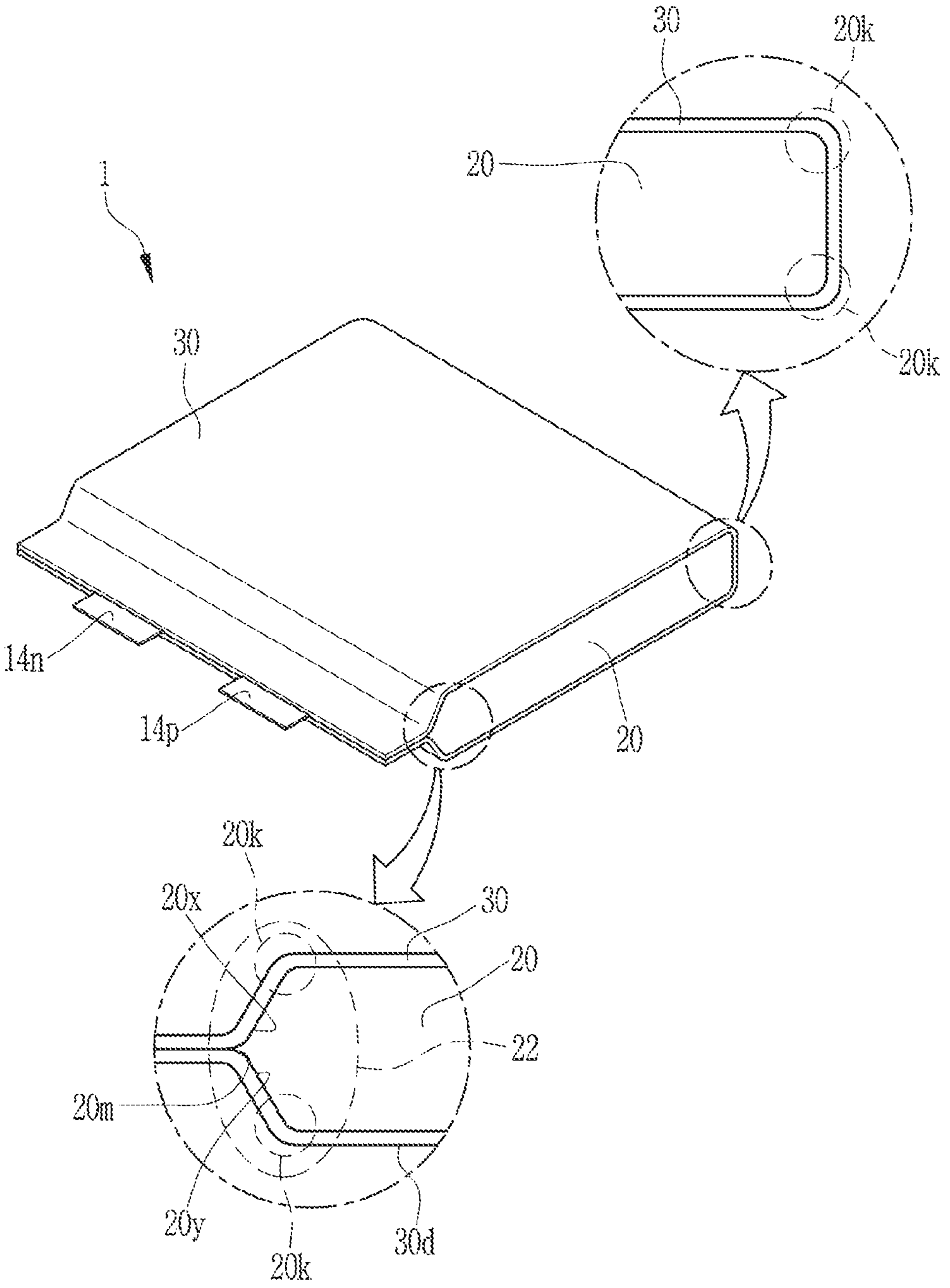
FIG. 10 is a view illustrating a secondary battery according to an embodiment of the present disclosure in which each plate has curved corners.

FIG. 10 is a view illustrating a secondary battery 1 according to an embodiment of the present disclosure in which each plate 20 has rounded corners 20*k*.

The secondary battery 1 illustrated in FIG. 10 has a structure in which electrode tabs 14 are disposed on one side thereof. A plate 20 may include rounded corners 20*k*. This means that the corners are curved in a round shape rather than rectangular. As illustrated in a lower enlarged view of FIG. 10, the plate 20 may include an inclined portion 22 on a side where the electrode tabs 14 are disposed, and having a protruding center portion 20*m* and down-slope surfaces 20*x* and 20*y* at both sides of the center portion 20*m*. The inclined portion 22 may include rounded corners 20*k*. The down-slope surfaces 20*x* and 20*y* of the inclined portion 22 may be concaved near the center portion 20*m* so that the center portion 20*m* of the inclined portion 22 forms an acute angle.

As illustrated in an upper enlarged view of FIG. 10, each the plates 20 may include the rounded corners 20*k*. The rounded corners 20*k* of the plate 20 ensure that when the plate 20 and a pouch film 30 are coupled, the coupling force therebetween is prevented from being weakened at the corners 20*k*.

The inclined portion 22 and the rounded corners 20*k* of the plate 20 described with reference to FIGS. 9 and 10 may be all applied to one plate 20. Alternatively, only the inclined portion 22 or only the rounded corners 20*k* may be applied to the plate 20.

Figure 11:
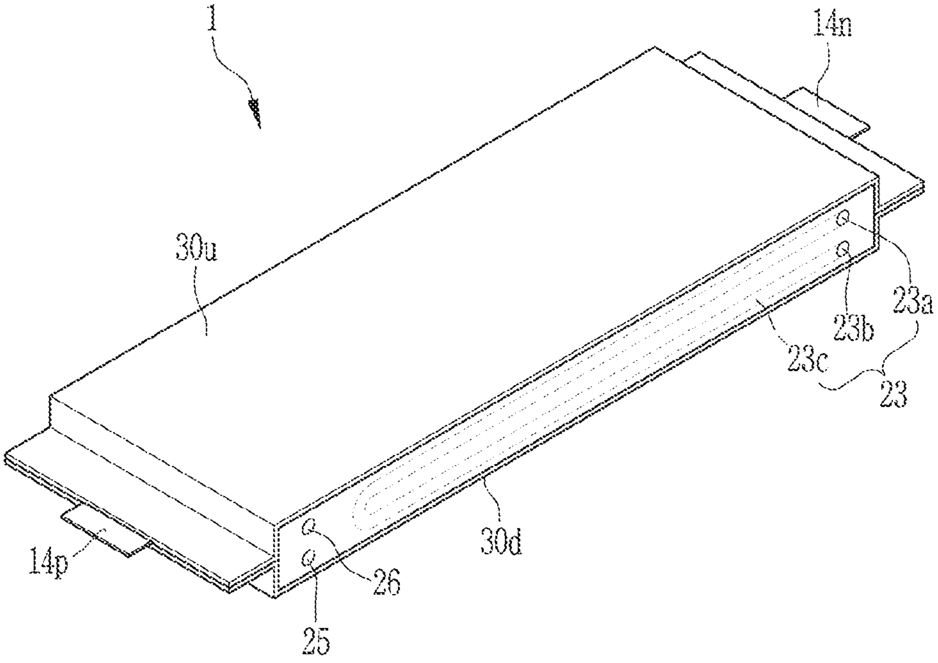
FIG. 11 is a view illustrating a secondary battery according to an embodiment of the present disclosure in which each plate has a flow channel, an electrolyte injection hole, and a gas outlet.

FIG. 11 is a view illustrating a secondary battery 1 according to an embodiment of the present disclosure in which each plate 20 has a flow channel 23, an electrolyte injection hole 25, and a gas outlet 26.

In the case of the secondary battery 1 according to the embodiment of the present disclosure, the plate 20 may include the electrolyte injection hole 25 through which an electrolyte 15 is injected into the secondary battery 1. The electrolyte injection hole 25 may allow the electrolyte 15 to be injected into the secondary battery 1 after a pair of plates 20 and a pouch film 30 are sealed. The electrolyte injection hole 25 may be formed through the plate 20. The electrolyte injection hole 25 formed through the plate 20 may include a cap or a sealing for preventing leakage of the electrolyte 15 injected through the electrolyte injection hole 25. Since the electrolyte injection hole 25 is formed in the planar plate-shaped rigid plate 20, the secondary battery 1 may be easier to handle in the process of injecting the electrolyte 15.

In the case of the secondary battery 1 according to the embodiment of the present disclosure, the plate 20 may include the gas outlet 26 through which gas is discharged to outside of the secondary battery 1. The gas outlet 26 may allow gas generated in the process of repeating charging and discharging of the secondary battery 1 to outside of the secondary battery 1. The gas outlet 26 may be formed in a form of a valve that opens in response to a pressure equal to or greater than a predetermined pressure and closes in response to a pressure less than the predetermined pressure. Since the gas outlet 26 is formed in the plate 20, the gas may be discharged to a predetermined position under the predetermined pressure even when pouch expansion occurs due to an increase in pressure.

The secondary battery 1 according to the embodiment of the present disclosure may be configured such that a weak coupling force portion is formed between the plates 20 and the pouch film 30 so that the gas generated in the secondary battery 1 is discharged through the weak coupling force portion to outside. For example, when a weak coupling force portion is formed between the plates 20 and a first pouch film 30*u* a second pouch film 30*d*, the coupling therebetween is released on the weak coupling force portion, causing the gas to be discharged therethrough. The weak coupling force portion between the plates 20 and the pouch films 30 may be formed on any one of a front surface, a back surface, an upper surface, and a lower surface of the plate 20. Therefore, a discharge direction of the gas from the secondary battery 1 may be determined upon the manufacture of the secondary battery 1.

In the case of the secondary battery 1 according to the embodiment of the present disclosure, the plate 20 may include the flow channel 23 through which a cooling fluid or a heating fluid flows. The flow channel 23 includes an inlet 23*a* and an outlet 23*b* formed at one side of the plate 20, and a channel 23*c* formed inside the plate 20 to connect the inlet 23*a* and the outlet 23*b* to each other. The channel 23*c* may be formed in various shapes in the plate 20. For example, the channel 23*c* may have a serpentine shape to increase the surface area. The flow channel 23 may be formed in only one of the pair of plates 20 of the secondary battery 1, or may be formed in each of the plates 20. At least one flow channel 23 may be formed in one plate 20. The flow channels 23 of adjacent secondary batteries 1 may be connected to each other.

Figure 12:
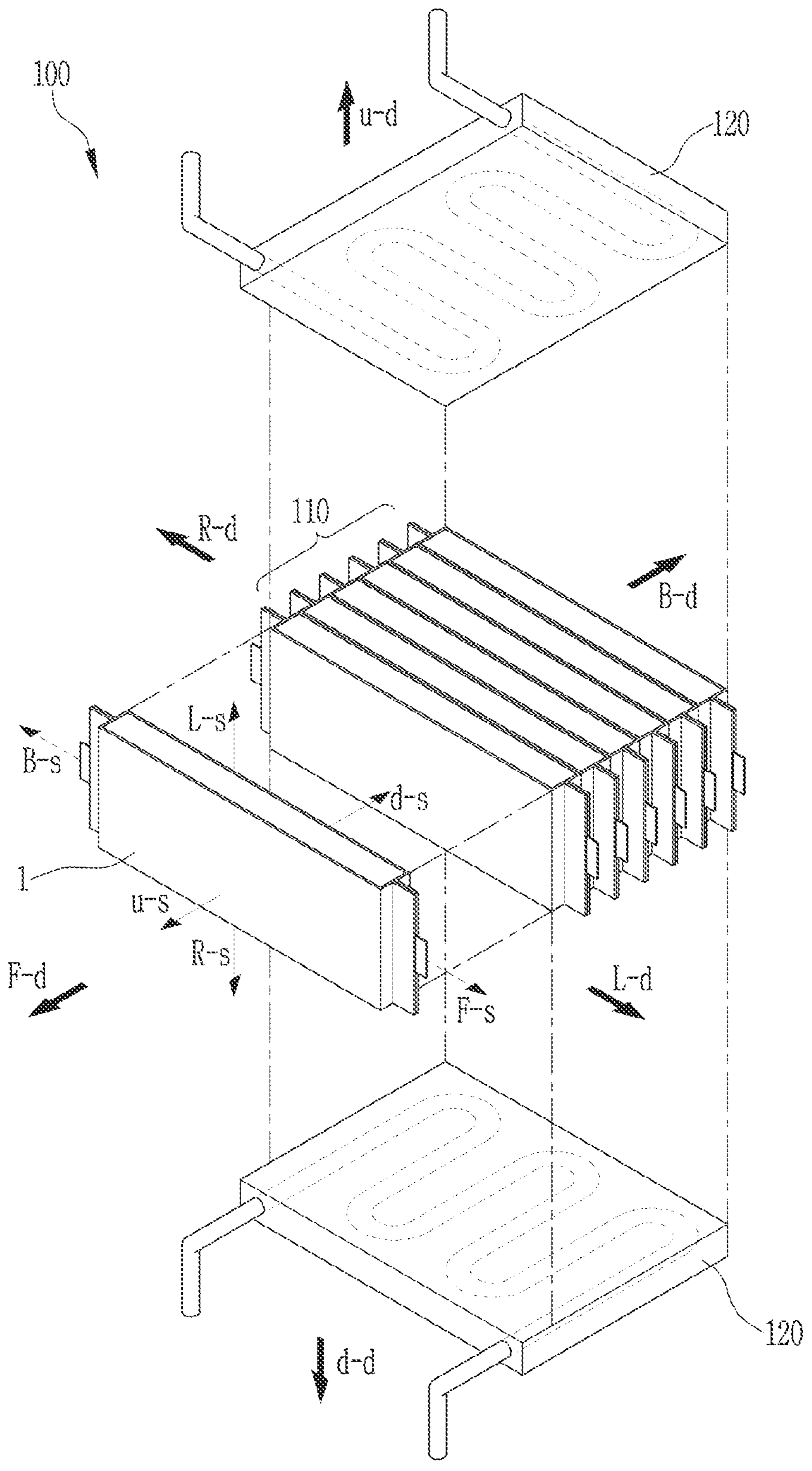
FIG. 12 is a view illustrating a battery module according to an embodiment of the present disclosure.

FIG. 12 is a view illustrating a battery module 100 according to an embodiment of the present disclosure.

As illustrated in FIGS. 12, the battery module 100 according to the embodiment of the present disclosure may include a plurality of secondary batteries 1 stacked in a direction, the secondary battery including an electrode assembly 10, a plate 20 disposed on both sides of the electrode assembly 10, and a pouch film 30 coupled to the plate 20 and accommodating the electrode assembly 10. The secondary battery 1 of the battery module 100 may be configured such that the plate 20 is disposed on the electrode assembly in a first direction, and an electrode tab 14 of the electrode assembly 10 is disposed in a second direction orthogonal to the first direction. The electrode tabs 14 may be disposed such that both a positive electrode tab 14*p* and a negative electrode tab 14*n* are disposed in the same predetermined direction orthogonal to the upper and lower directions u-d and d-d or the positive electrode tab 14*p* and the negative electrode tab 14*n* are disposed in opposite directions orthogonal to the upper and lower directions u-d and d-d. The plurality of secondary batteries 1 may be stacked in a predetermined direction to constitute a secondary battery stack 110. In other words, the battery module 100 may include the secondary battery stack 110.

The upper direction, lower direction, left direction, right direction, front direction, and back direction used herein for describing the orientation of the battery module 100 are determined with respect to the battery module 100. The upper and lower sides u-s and d-s of the secondary battery 1 may correspond to the front and back directions F-d and B-d of the battery module 100. The left and right sides L-s and R-s of the secondary battery 1 may correspond to the upper and lower directions u-d and d-d of the battery module 100. The front and back sides F-s and B-s of the secondary battery 1 may correspond to the left and right directions L-d and R-d of the battery module 100.

The battery module 100 according to the embodiment of the present disclosure may further include a heat sink 120 disposed in contact with the plates 20. The heat sink 120 may be disposed in contact with the secondary battery 1. The heat sink 120 may receive heat generated by the secondary bandy 1 and dissipate the heat to outside of the battery module 100. The heat sink 120 may be disposed in the upper direction u-d of the battery module 100, in the lower direction d-d of the battery module 100, or in each of the upper and lower directions u-d and d-d of the battery module 100.

The plurality of secondary batteries 1 may be configured such that the plates 20 are aligned in the upper and lower directions u-d and d-d of the battery module 100. With this structure, there exists no space generated between the plates 20 and the heat sink 120 when the heat sink 120 is coupled to the secondary battery stack 110, so that heat transfer may be improved. One surface of the heat sink 120 may be formed to be flat to make contact with the plate 20 of the secondary battery 1, and the opposite surface of the heat sink 120 may have a large surface area to make contact with air. The heat sink 120 may have a flow channel 23 through which cooling water or the like flows.

Figure 13:
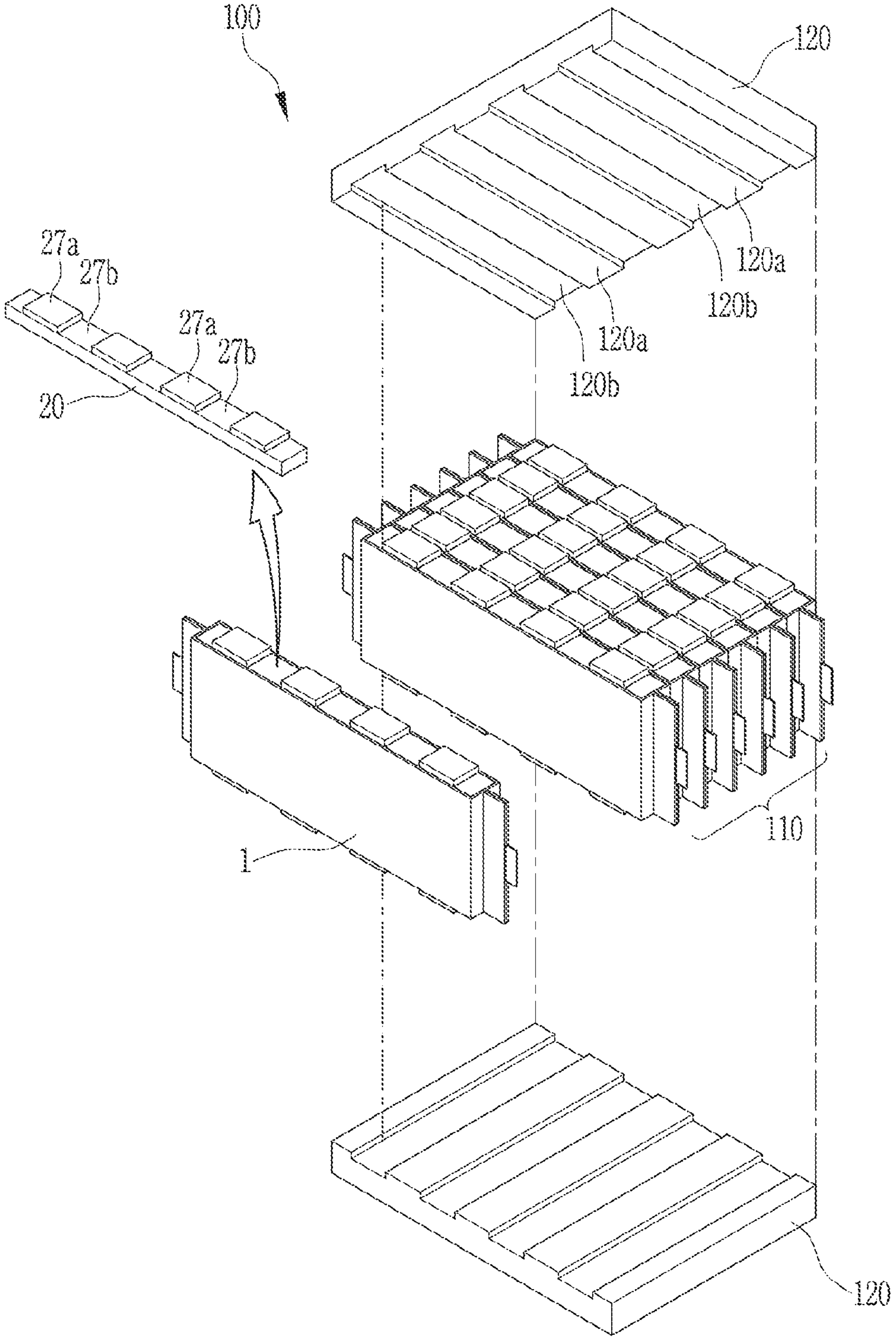
FIG. 13 is a view illustrating a plurality of secondary batteries according to an embodiment of the present disclosure and a battery module, in Which each plate has a plurality of protrusions and a plurality of depressions.

When the plates 20 are pressed together in the front and back directions F-d and B-d in which the secondary batteries 1 are stacked to form the secondary battery stack 110, the coupling force between the pouch films 30 and the plates 20 may become stronger. Therefore, the secondary batteries 1 may be able to more efficiently withstand an increase in internal pressure, FIG. 13 is a view illustrating a plurality of secondary batteries 1 according to an embodiment of the present disclosure and a battery module 100, in which each plate 20 has a plurality of protrusions 27*a* and a plurality of depressions 27*b*.

A plate 20 of the secondary battery 1 may include a protrusion 27*a* on a surface thereof opposite to a surface thereof facing an electrode assembly 10. A plurality of protrusions 27*a* may be formed on the plate 20, a depression 27*b* may be formed between each of the protrusions 27*a* That is, the protrusions 27*a* and the depressions 27*b* may be alternately repeatedly formed on the plate 20. With the provision of the protrusions 27*a* formed on the plate 20, the surface area of the plate 20 may increase, so that the heat generated by the secondary battery 1 may be more efficiently dissipated to outside of the secondary battery 1.

A surface of the heat sink 120 being in contact with the plates 20 may have a shape corresponding to those of the protrusions 27*a* and the depressions 27*b* formed on the plates 20. The protrusions 27*a* and the depressions 27*b* formed on the plates 20 may be engaged to a plurality of depressions 120*b* and a plurality of protrusions 120*a* formed on one surface of the heat sink 120, so that the heat sink 120 and the plates 20 may align with each other. The contact area between the plates 20 and the heat sink 120 may be increased by the protrusions 27*a* and 120*a* and the depressions 27*b* and 120*b*, so that the heat may be more efficiently transferred to the heat sink 120 through the plates 20.

Figure 14:
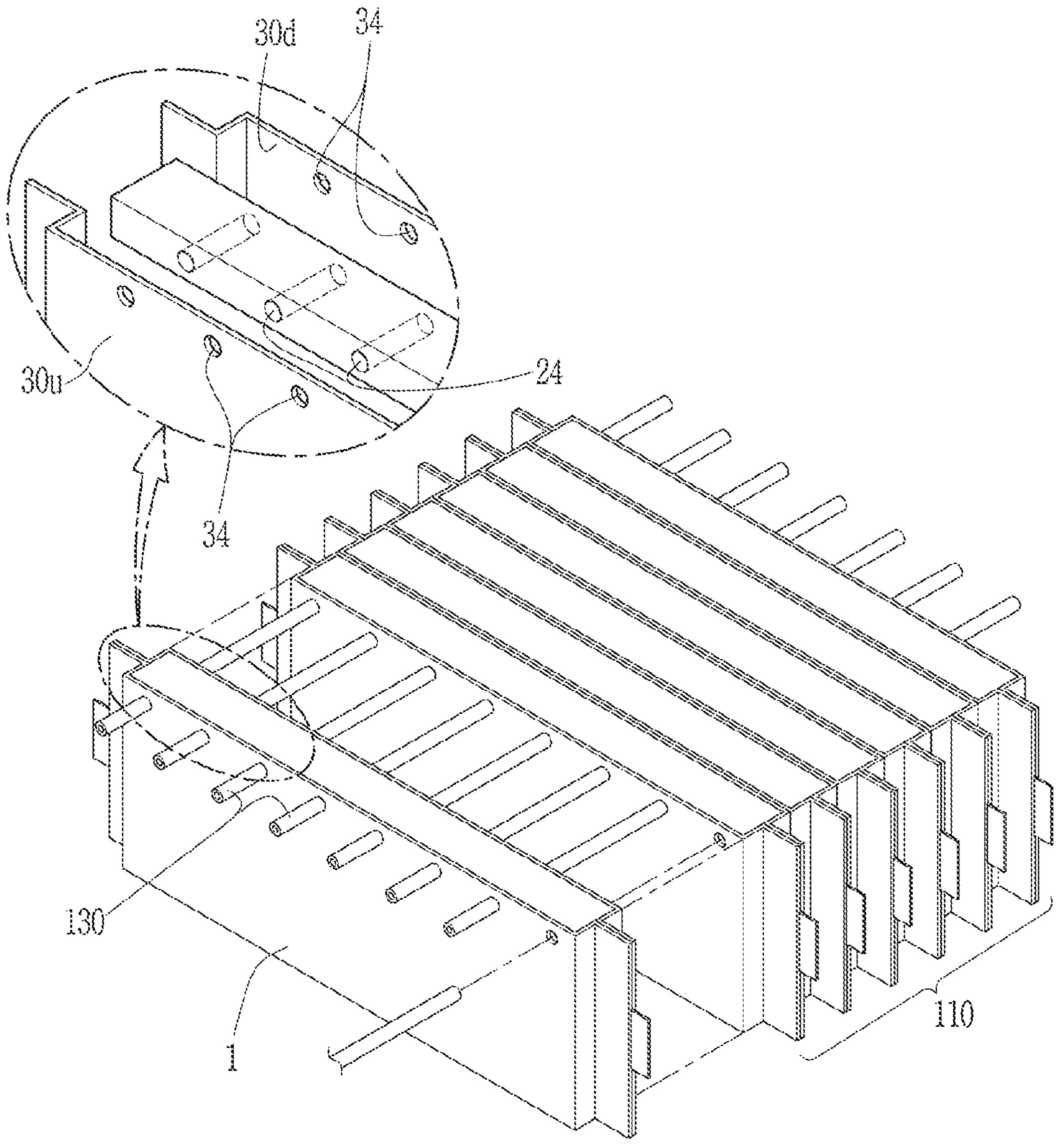
FIG. 14 is a view illustrating a plurality of secondary batteries according to an embodiment of the present disclosure and a battery module, in which a plurality of through-holes are formed.

FIG. 14 is a view illustrating a plurality of secondary batteries 1 according to an embodiment to of the present disclosure and a battery module 100, in which a plurality of through-holes is formed.

A plate 20 of the secondary battery 1 may include at least one first hole 24 extending therethrough in a direction, and a pouch film 30 may include a second hole 34 formed at a position corresponding to the first hole 24. Here, the direction is a direction in which the secondary batteries 1 are stacked. The first hole 24 may be formed in the plate 20 to extend in upper and lower side directions of the secondary battery 1, that is, the front and back directions of the battery module 100. The second hole 34 may be formed in each of first and second pouch films 30*u* and 30*d* at a position corresponding to the first hole 24 of the plate 20. The first hole 24 and the second holes 34 of the plurality of second batteries 1 may be formed at the same positions. The first hole 24 and the second holes 34 of each of the second batteries 1 may overlap to form a through-hole extending through the secondary battery 1. A plurality of through-holes may be formed in each of the secondary batteries 1.

The battery module 100 formed by using the secondary battery 1 having the through-holes may further include a rod 130 penetrating through the first hole and the second hole and fixing the plurality of secondary batteries 1. When the plurality of secondary batteries 1 overlap in the front and back directions of the battery module 100, a plurality of through-holes of the secondary batteries 1 serves as a single continuous hole extending through the entire secondary battery stack 110. The rod 130 may be inserted into the continuous hole extending through the secondary battery stack 110 to fix the plurality of secondary batteries 1.

Since the rod 130 is inserted into the first hole 24 extending through the plate 20, heat exchange with the plate 20 is facilitated. The rod 130 may include a flow channel through which a cooling fluid flows. When the rod 130 is a pipe, the heat generated by the secondary battery 1 is transferred to the cooling fluid through the rod 130 inserted into the plate 20, so that the heat is dissipated efficiently. The rod 130 may be inserted into each of the through-holes formed in each of the secondary batteries 1. Each of the rods 130 may be connected to the adjacent rods 130 so that a to continuous channel through which the cooling fluid flows may be formed.

Figure 15:
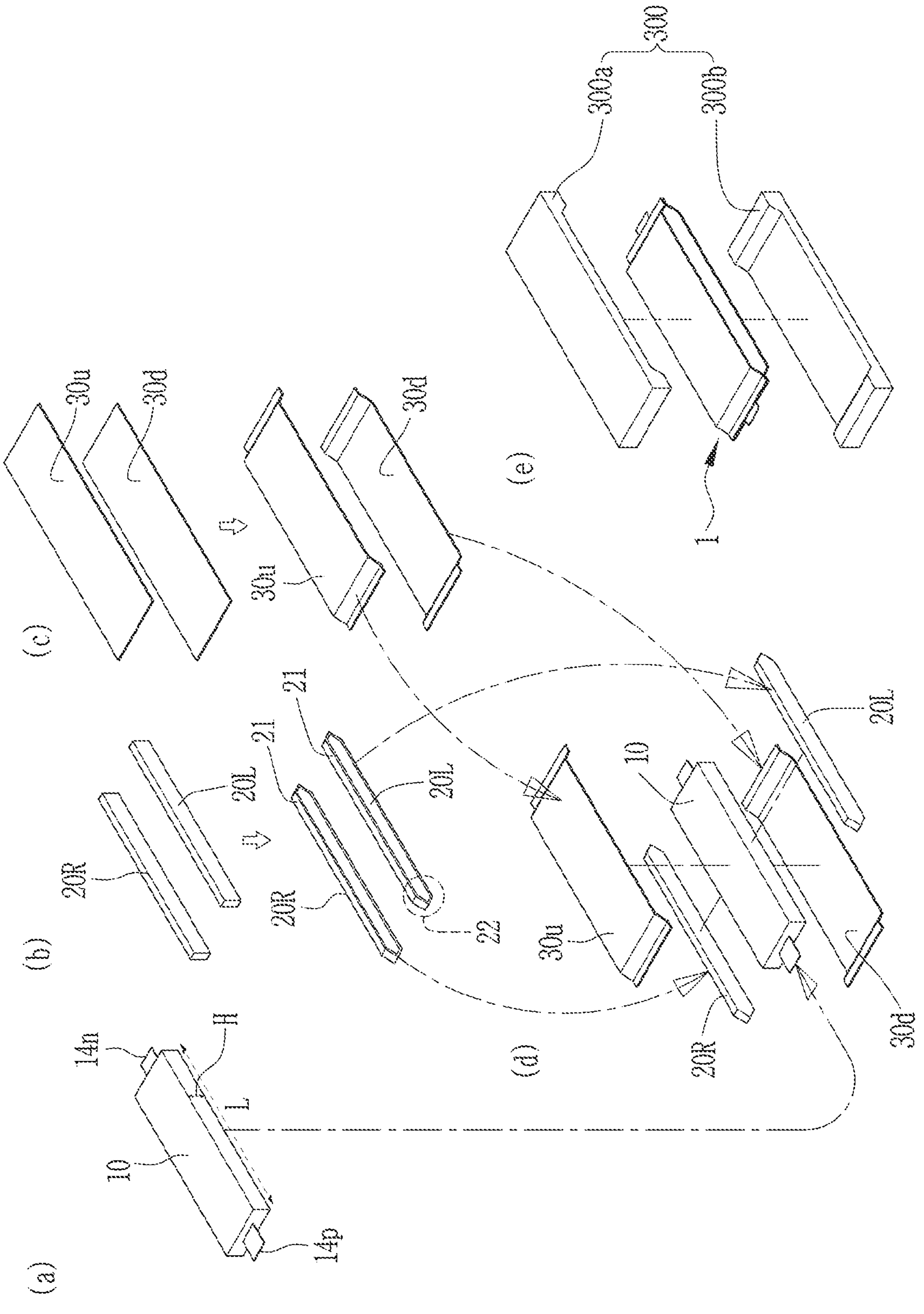
FIG. 15 is a view illustrating a method of manufacturing a secondary battery according to an embodiment of the present disclosure.

FIG. 15 is a view illustrating a method of manufacturing a secondary battery according to an embodiment of the present disclosure.

The method of manufacturing the secondary battery according to the embodiment of the present disclosure may include preparing an electrode assembly 10; preparing a pair of plates 20; is preparing a pouch film 30; disposing the electrode assembly 10 on the pouch film 30 and disposing the plates 20 on both sides of the electrode assembly 10; and performing sealing for coupling the pouch film 30 and the plates 20.

In the step of preparing the electrode assembly 10, a positive electrode 11, a separator 12, and a negative electrode 13 are stacked and then electrode tabs 14 are connected thereto to form the electrode assembly 10. By the step of preparing the electrode assembly 10 performed in this manner, the electrode assembly 10 illustrated in (a) of FIG. 15 is prepared. The process of forming the electrode assembly 10 may be performed using a known method.

In the step of preparing the pair of plates 20 illustrated in (b) of FIG. 15, the plates 20 formed to have a height H and a length L corresponding to the size of the electrode assembly 10 are provided. The plates 20 may be provided as a pair of a first plate 20L and a second plate 20R. In the step of preparing the pair of plates 20, each of the plates 20 may be subjected to processing to form an inclined portion 22. In the step of preparing the pair of plates 20, a coaling layer 21 made of the same material as an inner coating 31 of the pouch film 30 may be further formed on a surface of each of the plates 20 being in contact with the pouch film 30. The coating layer 21 may also be formed on a surface of each of the plates 20 facing the electrode assembly 10. After performing the process of forming the inclined portion 22 on each of the plates 20 or processing the corners of each of the plates 20 into a round shape, the coaling layer 21 may be further formed on a surface of each of the plates 20 being in contact with the pouch film 30.

In the step of preparing the pouch film 30 illustrated in (c) of FIG. 15, the pouch film 30 is cut to correspond to the sizes of the electrode assembly 10 and the plates 20. In the step of preparing the pouch film 30, the pouch film 30 may be subjected to forming into a shape corresponding, to that of the plates 20 so that a corner where two sides of the pouch film 30 meet is formed. The forming of the pouch film 30 may be performed to form the pouch film 30 into a shape corresponding to that of the plates 20.

The steps of preparing the electrode assembly 10, preparing the pair of plates 20, and preparing the pouch film 30 illustrated in (a), (b) and (c) of FIG. 15 may be performed in parallel and independent of each other, or in conjunction with each other in accordance with a predetermined design.

The step illustrated in (d) of FIG. 15 is a process of disposing the electrode assembly 10, the pouch film 30, and the plates 20 at designed positions. The electrode assembly 10 is disposed on the formed pouch film 30, and then the plates 20 are disposed on left and right sides of the electrode assembly 10 on the pouch film 30. When two pouch films 30 including a first pouch film 30*u* and a second pouch film 30*d* are provided, the second pouch film 30*d* is disposed on the plates 20 to cover the electrode assembly 10.

The step illustrated in (e) of FIG. 15 is a process of performing sealing through thermal fusion by a heating and pressing device 300 by heating and pressing portions where the pouch films 30 and the plates 20 are in contact with each other, portions where the pouch films 30 are in contact with each other, and portions where the pouch films 30 and the electrode tabs 14 are in contact with each other. The sealing may be performed using a thermal fusion method. The heating and pressing device 300 may include an upper heating and pressing device 300*a* and a lower heating and pressing device 300*b* so as to press the secondary battery 1 in upper and lower directions.

In the method of manufacturing the secondary battery according to the embodiment of the present disclosure described with reference to FIG. 15, the number of processes is increased because the step of preparing the plates 20 is additionally performed. However, the step of preparing the to plates 20 is not a technically difficult process and may be performed separately without changing existing facilities for the manufacture of secondary batteries. In addition, since the corner where two sides of the pouch film 30 meet is formed. (that is, the pouch film 30 is folded) in the step of preparing the pouch film 30, the possibility of damage to the pouch film 30 is significantly reduced. In addition, since the step of disposing the pouch film 30, the plates 20, and the electrode assembly 10 and the step of performing sealing are performed using the existing facilities, the cost of changing the facilities is low.

While the exemplary embodiments of the disclosure have been described above, the embodiments are only examples of the disclosure, and it will be understood by those skilled in the art that the disclosure can be modified or changed in various forms without departing from the technical spirit of the disclosure.

Simple modifications or changes of the present disclosure belong to the scope of the present disclosure, and the detailed scope of the present disclosure will be more clearly understood by the accompanying claims.

What is claimed is:

1. A secondary battery comprising:

an electrode assembly including electrode tabs, the electrode tabs are disposed on front side or back side of the electrode assembly;

a first plate disposed on left side of the electrode assembly;

a second plate disposed on right side of the electrode assembly, wherein the first plate and the second plate are separate pieces respectively disposed on opposing sides of the electrode assembly where the electrode tabs are not disposed; and a pouch film configured to cover upper side and lower side of the electrode assembly and seal by thermal fusion to upper surface, lower surface, front surface, and back surface of each of the first and second plates to accommodate the electrode assembly therein, wherein the respective surfaces of the first and second plates that face away from the opposing sides of the electrode assembly are not covered by the pouch film.

2. The secondary battery of claim 1, wherein each of the first and second plates includes an inclined portion on the front side or back side.

3. The secondary battery of claim 2, wherein each of the first and second plates includes rounded corners.

4. The secondary battery of claim 2, wherein the inclined portion is formed such that each of the first and second plates protrudes at a center portion of the front surface or back surface thereof toward a front side direction or back side direction of the electrode assembly and has down-slope surfaces at both sides of the center portion of the front surface or back surface of each of the first and second plate or such that each of the first and second plates protrudes at one side of upper surface or lower surface thereof toward the front side direction or back side direction of the electrode assembly and has a down-slope surface.

5. The secondary battery of claim 1, wherein each of the first and second plates is made of a material including any one of metal, alloy, polymer, synthetic resin, and ceramic.

6. The secondary battery of claim 1, wherein each of the first and second plates is made of metal, and includes a coating layer made of the same material as an inner coating of the pouch film, wherein the coating layer is formed on the upper surface, lower surface, front surface, and back surface of each of the first and second plates, and the coating layer contacts the pouch film.

7. The secondary battery of claim 1, wherein at least one of the first and second plates includes an electrolyte injection hole through which an electrolyte is injected into the secondary battery.

8. The secondary battery of claim 1, wherein at least one of the first and second plates includes a gas outlet through which gas is discharged to outside of the secondary battery.

9. The secondary battery of claim 1, wherein at least one of the first and second plates includes a flow channel through which a cooling fluid or a heating fluid flows.

10. The secondary battery of claim 1, wherein at least one of the first and second plates includes a protrusion on a surface thereof opposite to a surface thereof facing the electrode assembly.

11. A battery module comprising a plurality of secondary batteries stacked in front and back directions of the battery module, each secondary battery of the plurality of secondary batteries including:

an electrode assembly including electrode tabs, the electrode tabs are disposed on front side or back side of the electrode assembly;

a first plate disposed on left side of the electrode assembly;

a second plate disposed on right side of the electrode assembly, wherein the first plate and the second plate are separate pieces respectively disposed on opposing sides of the electrode assembly where the electrode tabs are not disposed; and a pouch film configured to cover upper side and lower side of the electrode assembly and seal by thermal fusion to upper surface, lower surface, front surface, and back surface of each of the first and second plates to accommodate the electrode assembly therein, wherein the plurality of secondary batteries is configured such that the first and second plates are disposed in the upper and lower directions of the battery module, and the electrode tabs are disposed in the left and right directions of the battery module, wherein the left and right sides of the secondary battery correspond to the upper and lower directions of the battery module, and wherein the respective surfaces of the first and second plates that face away from the opposing sides of the electrode assembly are not covered by the pouch film.

12. The battery module of claim 11, wherein each of the first and second plates includes a first hole extending therethrough in front and back directions of the battery module, and the pouch film includes a second hole formed at a position corresponding to the first hole.

13. The battery module of claim 12, further comprising a rod penetrating through the first hole and the second hole of each of the plurality of stacked secondary batteries and fixing the plurality of stacked secondary batteries.

14. The battery module of claim 13, wherein the rod includes a flow channel through which a cooling fluid flows.

15. The battery module of claim 11, further comprising a heat sink disposed in contact with at least one of the first and second plates.

16. The secondary battery of claim 1, wherein the first and second plates are planar in shape.

17. The battery module of claim 11, wherein the first and second plates are planar in shape.

* * * * *